Dec. 12, 1967 F. G. KONSTANDT 3,357,222
METHOD OF FORMING A SPIRAL OF RESILIENT MATERIALS, A MACHINE
AND A MACHINE INSTALLATION FOR THE SAME
Filed Jan. 6, 1965 3 Sheets-Sheet 1

INVENTOR
Francisco Goldberger
Konstandt

Michael J. Striker
ATTORNEY

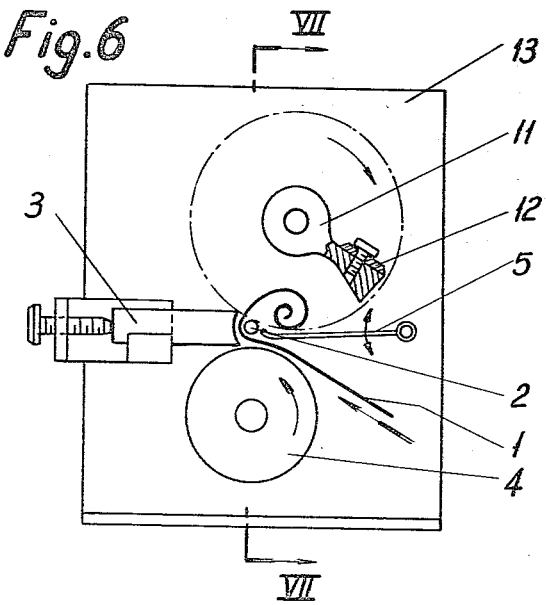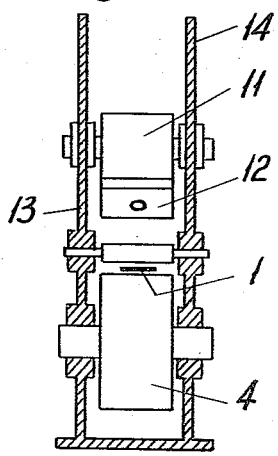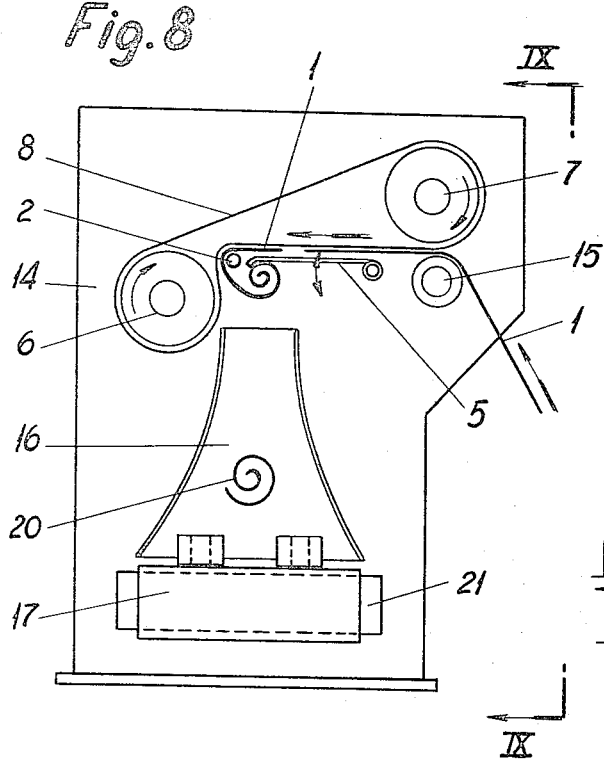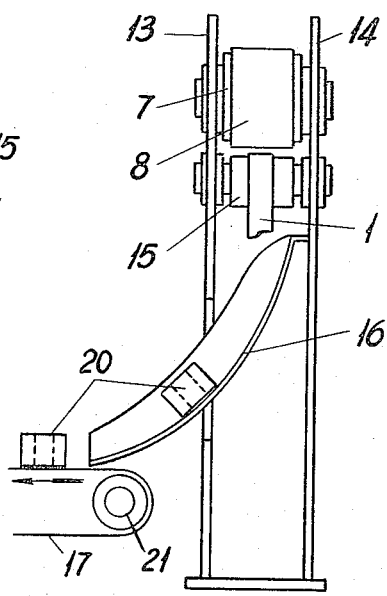

Dec. 12, 1967 F. G. KONSTANDT 3,357,222
METHOD OF FORMING A SPIRAL OF RESILIENT MATERIALS, A MACHINE
AND A MACHINE INSTALLATION FOR THE SAME
Filed Jan. 6, 1965 3 Sheets-Sheet 3
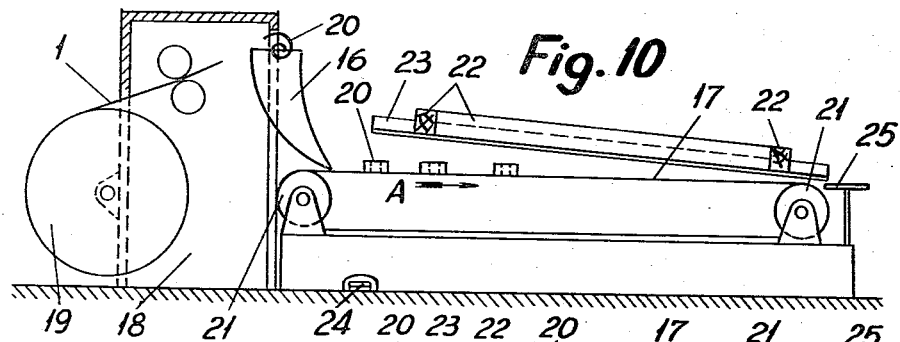
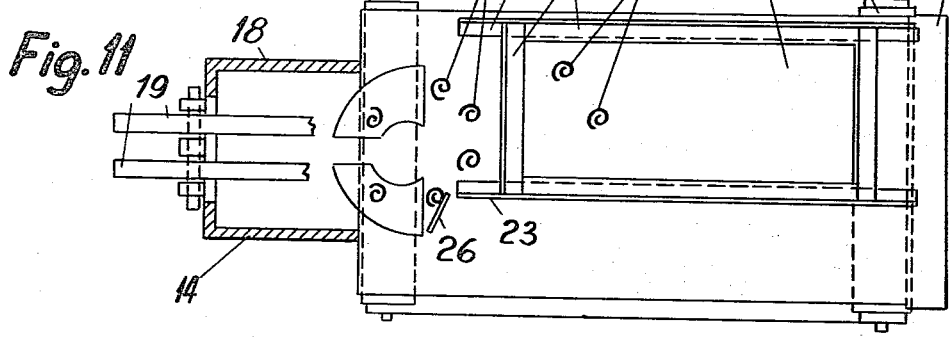
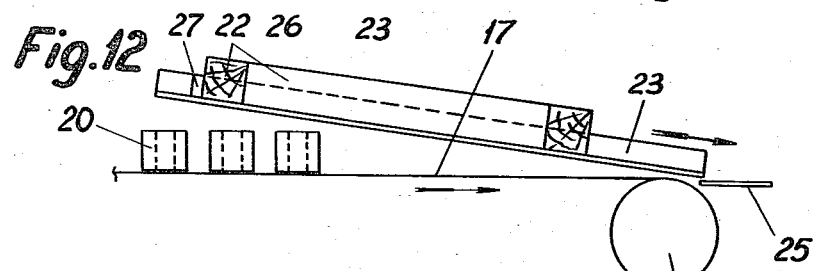
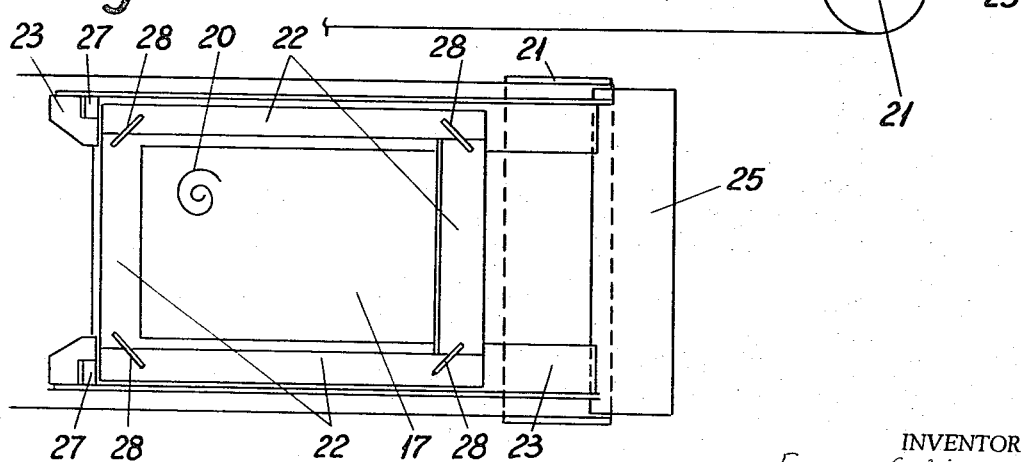
INVENTOR
Francisco Goldberger-
Konstandt
Michael J. Striker
ATTORNEY United States Patent Office 3,357,222
Patented Dec. 12, 1967

3,357,222
METHOD OF FORMING A SPIRAL OF RESILIENT MATERIALS, A MACHINE AND A MACHINE INSTALLATION FOR THE SAME
Francisco Goldberger Konstandt, Seestrasse, Weggis, Lucerne, Switzerland
Filed Jan. 6, 1965, Ser. No. 424,885
Claims priority, application Great Britain, Jan. 15, 1964, 1,790/64
17 Claims. (Cl. 72—146)

ABSTRACT OF THE DISCLOSURE

A machine for producing spirals from strip-shaped resilient materials. Means is provided for feeding and finding the strip. At least one roller curls the strip being fed. An abutment plate progressively unbends the thus-curled strip. Delivery means passes the resulting spiral standing upright on its edges onto a collecting device.

---

This invention relates to a method of forming a spiral of resilient materials, such as metal, paper, cardboard or synthetic resin, which are already in the form of a strip. Furthermore it relates to special machines for the continuous forming of such spirals as well as for their correct placing between sheets to form a hollow panel structure.

It is already known to form spirals of wood by cutting a shaving from a block and to produce spirals of uniform width and with correct spacings between the walls of same so as to provide a so-called open spiral suitable to be used as a distance piece in the manufacture of hollow panels.

The method which is described in the present invention consists in forcing a strip through suitable bending means and in contacting the formed ring against an abutment so as to increasingly unbend the strip as it is being curled, thus progressively enlarging the radius of curvature as measured at successive regions along its length with the result that an open spiral is formed.

The strip which is being formed into a spiral can be either pushed into the bending means or drawn into same. Furthermore, the strip can be forced into these means so as to emerge standing upright or forced downwardly in which case the weight of the same helps the contact means to increasingly unbend the spiral.

The contact means, which is basically an abutment surface, can be made displaceable so as to be able to regulate the ratio of unbending of the spiral.

The invention also provides machines for the forming of such spirals, which are characterized in that they comprise means for feeding and guiding the strip to bending means, bending means formed by at least one roller which curls the incoming strip, and an adjustable abutment plate for progressively unbending the curled strip, delivery means of the formed spiral which lands same standing upright on a collecting device and means for filling frames with the said spirals.

In one preferred embodiment of the machine a driven feed drum pushes the strip material into the bending means, said bending means, being formed by a roller and the concave edge of an adjustable plate, and cutting means for severing the formed spiral from the strip.

Another preferred embodiment of the machine comprises at least one roller backing a guiding roller with a continuous belt passing round them, a shaping roller pressing against the said belt and forming a bight in the same against the first mentioned roller and a second guide roller placed beneath the first guide roller forcing out lengths of the strip material onto the abutment plate and into the constriction between the first roller and the shaping roller.

Furthermore, the invention also provides a machine installation characterized in that the delivery means of the formed spirals are placed above a conveyor belt running on rollers, one of which is connected to a driving means, said conveyor belt carrying a support for the panel frame to be filled.

The invention will now be more particularly described with reference to the accompanying drawings in which FIGURES 1, 2 and 3 illustrate the method of forming spirals in which the strip is pushed into the bending means;

FIGURE 6 is a diagrammatic side-view of a machine applying method illustrated in FIGURES 1 to 3;

FIGURE 7 is a cross section along the line VII—VII of FIGURE 6;

FIGURE 8 is a diagrammatic side-view of a machine applying the method illustrated in FIGURES 4 and 5;

FIGURE 9 is an elevation along line IX—IX of the machine illustrated in FIGURE 8;

FIGURE 10 is a side elevation of a spiral producing machine coupled to a conveyor belt provided with means for filling a frame;

FIGURE 11 is a plan of the arrangement shown in FIGURE 10, and

FIGURES 12 and 13 are side and plan elevations of the frame support and the adjacent regions of the arrangement shown in FIGURES 10 and 11, on a larger scale.

All the drawings are diagrammatic, showing only essential and equivalent parts of the machine which are marked with the same reference numbers.

Figure 1A:
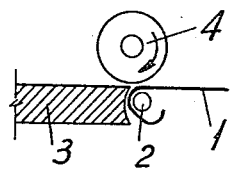
Figure 1B:
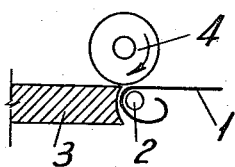
Figure 1C:
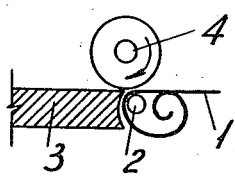

Referring to FIGURE 1 of the drawings, a strip 1 of the deformable material is shown being drawn from right to left by a driving roller 2, the strip pinched against the concave edge of a plate 3 as it passes round the roller 2. As the strip emerges from the roller, its own weight will tend to pull it downwards somewhat, and so provide moment on the portion leaving the roller 2 to reduce the curvature produced by the action of the roller. As more and more of the strip emerges, the moment acting at the exit from the rollers 2 increases, the strip curvature thereby being progressively reduced along its length. This is illustrated in the three successive stages of the operation marked FIG. 1a, 1b, and 1c. Although a suitable choice of the roller radius and the profile of the concave edge of the plate 3 in consideration of such properties of the strip 2, as its thickness, density and elasticity, may help to control the degree of spirality thus produced, the results are seldom quite satisfactory. This becomes even more noticeable when the means push the strip 1 upwards, since in the latter case the weight of the strip cannot play the same role. Thus, the spirals produced are not as open as they are required to be for the purpose of serving as distance pieces in hollow panels.

Figure 2A:
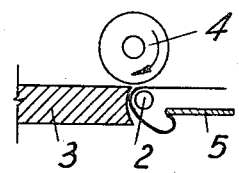
Figure 2B:
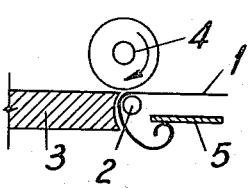
Figure 2C:
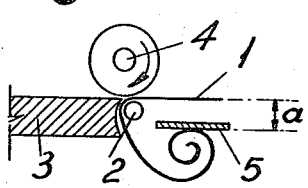

In FIGURES 2a, 2b and 2c the bending means are provided with contact means which allow of a controlled progressive unbending of the formed spiral. The strip 1 moves between roller 4 and roller 2 and, as it emerges below said rollers, it is brought against an abutment plate 5. Thus, in addition to the unbending moment produced by its own weight, the strip is also caused to open up by friction against the abutment plate 5.

Figure 3A:
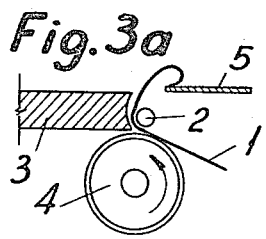
Figure 3B:
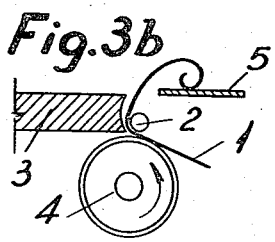
Figure 3C:
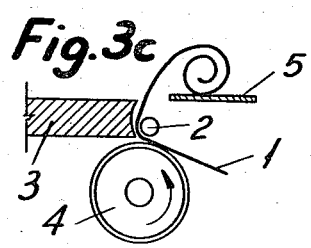

In FIGURE 3 the strip 1 is led upwards to the roller 2 from a feed drum 4, the surface of which can be grooved or roughened or covered with a material such as rubber or synthetic resin having a relatively high coefficient of friction. As in the example shown in FIGURE 1, the strip is pinched between the concave edge of plate 3 and the roller 2 and as the curved portion emerges from the bending means it meets and is rubbed against an abutment plate 5. This has the effect of urging the curved part of the strip upwards as well as applying a frictional force to the face of the spiral rubbing against it and consequently imposing a deformation at that portion of the strip emerging from the roller 2 counter to the curvature given by the roller. It will be seen from the three successive stages of the operation shown in FIGURES 3a, 3b, and 3c that this leads to a progressive reduction in the curvature of the strip along its length.

Figure 4A:
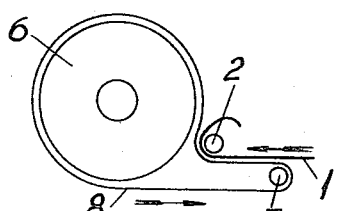
FIGURES 4 and 5 illustrate the method by which the strip is drawn into the bending means.
Figure 4B:
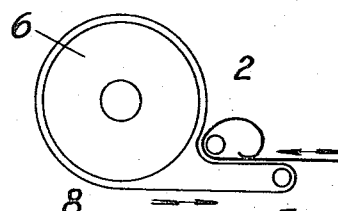
Figure 4C:
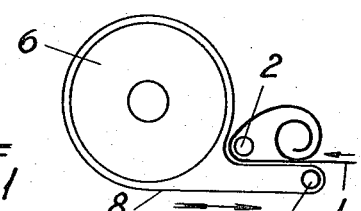

Whilst in the above examples the strip is being pushed into the bending means, in the following examples the strip is drawn into same. The method illustrated in FIGURE 4 provides a larger diameter roller 6 backing a guide roller 7, a continuous belt 8 passing round said rollers, the tangent to the rollers at the constriction between them being of approximately 80° to the direction of introduction of the strip 1. A shaping roller 2 forms a bight in the belt against the roller 6. Any of the rollers may be driven to move the belt 8 and the strip 1 is drawn along by the belt into the constriction between the rollers 2 and 6. The curvature so produced results in the formation of a ring, but as the emerging strip curls round to bear against the belt 8 between the rollers 2 and 7 which thereby provides an upwards movement on the strip at the exit from the roller 2, the diameter of the already curved portion is opened and becomes a spiral. Nevertheless, in this example the spiral is not as open as it is required to be, for the same reasons as those given with respect to the method of FIGURE 1.

Figure 5A:
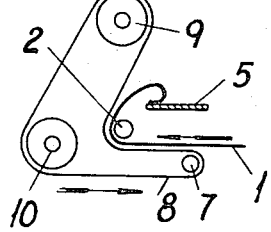
Figure 5B:
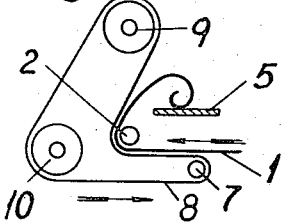
Figure 5C:
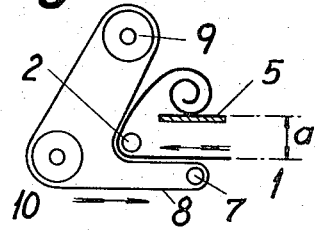

FIGURE 5 shows a modification of the method illustrated in FIGURE 4 the strip 1 again being fed along the belt 8 but in place of the backing roller 6, there are two smaller spaced rollers 9, 10, which are located so as to direct the belt 8, as it passes the roller 2 at an adjustable angle which can vary according to the necessity of the case. The real advantage of this construction over the one of FIGURE 4 lies in the provision of the abutment plate 5 with which the emerging strip is brought into contact. The progressive opening of the spiral is thus controlled as in FIGURES 2 and 3. The same abutment plate 5 can be provided in the example shown in FIGURE 4.

In the methods illustrated, the roller 2 or the roller 6 may have a polygonal, e.g. hexagonal or octagonal, cross-section instead of the circular cross-section illustrated. This may produce discontinuities in the curvature of the strip but its general form, for the purposes of providing spacing elements, will be substantially equivalent to a true spiral. In some cases these ribs will even be an advantage, because they may help to maintain the form given to the strip.

The spacing of the abutting surface formed by plate 5 from the entry line of the strip will have an effect on the form of the resulting spiral. Thus, variation of the distance a shown in FIGURES 2, 3 and 5 can be employed to control the change of curvature imposed upon the strip emerging from the bending means. The greater the distance a, the greater the unbending force imposed upon the strip and consequently the resulting spiral will be the more open in form.

Referring now to FIGURES 6 and 7, a machine is shown embodying the method described with reference to FIGURE 3. The machine comprises a feed drum 4 which pushes the strip 1 into the bending means formed by a roller 2 and the concave edge 3 of an adjustable plate where the strip is being bent. The emerging end of the strip abuts against a vertically adjustable plate 5 which tends to unbend it. A rotating arm 11 carrying a cutting blade 12 is placed above the bending means. The cutting edge of the blade 12 cooperates with a similar cutting edge of the plate 3 and severs the spiral that has been formed. Due to its shape and position the rotating arm 11 lifts the spiral before the cutting edge of the blade 12 contacts the cutting edge of the plate 3 and thus avoids damaging the spiral in the course of severing same. It has been found advantageous to drive only the feed drum 4 and leave the roller 2 to rotate freely.

The above described elements are housed between two upright plates 13, 14, which are provided with openings housing the bearings in which the axis of the various elements can rotate.

FIGURES 8 and 9 illustrate a machine embodying the method shown in FIGURE 4, with the difference that in this machine the spirals emerge downwardly. The machine comprises a roller 6 backing a guiding roller 7 and a continuous belt 8 passing round both rollers. The shaping roller 2 forms a bight in the belt 8 against the roller 6. The strips 1, which are already cut into lengths according to the desired size of the spirals, are drawn by the guide roller 7 and the belt 8 over the plate 4 onto the shaping roller 2 into the constriction between the rollers 2 and 6. In order to ensure that the strip 1 enters onto the plate, a second guide roller 15 is placed underneath the guide roller 7 and presses the incoming strip 1 against the belt 8. The strips emerge from the bending means in the form of rings and as they contact the lower surface of plate 5 with their emerging end they become progressively opened, thus acquiring the desired spiral shape. In this machine the individual weight of the spiral provides an additional force which tends towards reducing the curvature, as has been already explained with reference to FIGURE 1.

Although for the sake of clarity both machines have been shown as processing only one strip, in practice these machines can be constructed with several parallel channels simultaneously processing a plurality of strips.

It will be seen that the machines are provided with especially curved chutes 16 upon which the spirals 20 are delivered and which pass them onto a conveyor belt 17 standing upright on their edges.

Owing to the high speed of production of the spirals with the above mentioned machines, the devices for filling the frames with spirals must have adequate capacity to make full use of the production and, therefore, in FIGURES 10 to 13 a preferred form of filling has been illustrated which cooperates fully with the said machines.

In these figures, reference numeral 18 indicates the general position occupied by a spiral-producing machine, which is not shown in detail since it can be any one of the machines already described. This machine processes rolls 19 of strip material to form spirals 20 which are delivered through chutes 16, that turn them through 90° to bring their axis into vertical position on a conveyor belt 17. The conveyor belt 17 runs on rollers 21 and is driven by a motor in the direction of arrow A. The speed of the belt 17 may be up to some 25 meters per minute.

A support for a panel frame 22 is located over the conveyor belt 17 and comprises a pair of spaced angle members 23 between which the frame 22 is located. The support is inclined relative to the conveyor belt surface, being very close at the exit end and being spaced above the belt at the end facing the machine 18 by a distance greater than the height of the spirals (which is also the depth of the frame). The spirals 20 are therefore dawn into the space beneath the frame by the movement of the conveyor belt 17 and are retained, as they move forward with the belt, by the inner edges of the frame 22.

The operation of the spiral-producing machine 18 is controlled by a foot-pedal 24 so that the machine is stopped as soon as sufficient spirals have been produced to fill a frame. As soon as the space beneath the frame has been filled, the frame is slid away from the machine 18 over a bridging member 25 at the conveyor exit to a table (not shown), the spirals 20 being forced forward by the conveyor belt 17 and the lowering of the frame 22, as it leaves the support 23, enclosing the spirals. Beyond the bridging member 25, the bonding of the cover plates to the frame is carried out in a known manner.

It will be seen from FIGURE 11 that the conveyor belt 17 is rather wider than the illustrated frame 22 and the purpose of this is to ensure that the belt will be able to be used for the construction of panels up to the maximum desired size. When smaller panels are being produced, a guide or deflector 26 is used to direct the spirals 20 into the confines of the frame 22.

A preferred feature of the method according to the invention is the assembly of the frame upon its support. As shown in FIGURES 12 and 13, end stops 27 are provided on the angle members 23 to form abutments for the frame members, so that the frame parts can be accurately located. Metal clips 28 are then driven into corners of the frame 22 to act as temporary joints. These clips 28 merely serve to hold the frame parts together during the succeeding movement of the frame 22, the attachment of the outer sheets of the panel construction providing the final securing of the parts.

The method already described permits a very fast production of spirals. These are produced whilst the frame parts are being assembled. In the further processing to produce finished panels, the frames 22 embracing the spirals 20 do not require to be lifted until they have been secured to their outer sheets so that the fixing clips 28 are not required to stand any significant stresses.

According to this method the device is relatively compact since the conveyor 17 need only be equal in size to the largest panel produced.

What I claim is:

1. A machine for producing spirals of resilient materials which are already in the form of a strip, comprising means for feeding and guiding the strip to bending means, bending means formed by at least one roller which curls the incoming strip, an abutment plate for progressively unbending the curled strip, and delivery means of the formed spiral which pass same standing upright on its edges onto a collecting device.

2. A machine for producing spirals of resilient materials which are already in the form of a strip, comprising a driven feed drum pushing the strip material into bending means formed by a roller and the concave edge of an adjustable plate, an abutment plate for progressively unbending the curled strip, cutting means for severing the formed spiral from the strip, and delivery means of the formed spiral which passes same standing upright on its edges onto a collecting device.

3. A machine for producing spirals in accordance with claim 2, in which the abutment plate is vertically adjustable in order to be able to regulate the ratio of unbending of the curled strip.

4. A machine for producing spirals of resilient materials which are already in the form of a strip, comprising a driven feed drum pushing the strip material into bending means formed by a roller and the concave edge of an adjustable plate, an abutment plate for progressively unbending the curled strip, a rotating arm placed above the bending means and carrying a blade, the upper edge of the adjustable plate of the bending means cooperating with the said rotating blade to sever the formed spiral from the strip, and delivery means of the formed spiral which pass same standing upright on its edges onto a collecting device.

5. A machine for producing spirals in accordance with claim 4, in which the abutment plate is vertically adjustable in order to be able to regulate the ratio of unbending of the curled strip.

6. A machince for producing spirals in accordance with claim 4, in which at least one of the rollers is connected to driving means.

7. A machine for producing spirals in accordance with claim 4, in which at least one of the rollers forming the bending means has a polygonal cross-section.

8. A machine for producing spirals in accordance with claim 4, in which the delivery means of the formed spirals consist of specially curved chutes.

9. A machine for producing spirals of resilient materials which are already in the form of a strip cut into predetermined lengths, comprising at least one roller backing a guiding roller with a continuous belt passing round same, a shaping roller pressing against said belt and forming a bight in the same against the first mentioned roller, a second guide roller disposed beneath the first guide roller forcing out lengths of the strip material onto an abutment plate and into the constriction between the first roller and the shaping roller, said curled strip emerging from the bending means and contacting the other surface of the abutment plate for progressively unbending the said curled strip, and delivery means of the formed spiral which pass same standing upright on its edges onto a collecting device.

10. A machine for producing spirals in accordance with claim 9, in which the autbment plate is vertically adjustable in order to be able to regulate the ratio of unbending of the curled strip.

11. A machine for producing spirals in accordance with claim 9, in which at least one of the rollers is connected to driving means.

12. A machine for producing spirals in accordance with claim 9, in which at least one of the rollers forming the bending means has a polygonal cross-section.

13. A machine for producing spirals in accordance with claim 9, in which the delivery means of the formed spirals consist of specially curved chutes.

14. A machine installation for producing hollow panels filled with distance pieces, formed by spirals of resilient materials, which comprises a machine for producing spirals of resilient materials which are already in the form of a strip, said machine consisting of means for feeding and guiding the strip to bending means, bending means formed by at least one roller which curls the incoming strip, an abutment plate for progressively unbending the curled strip, and delivery means of the formed spiral which pass same standing upright on its edges onto a conveyor belt, placed beneath the said delivery means and running on rollers, one of which is connected to driving means, and a support for the panel frame to be filled placed on the said conveyor belt.

15. A machine installation for producing hollow panels filled with distance pieces, formed by spirals of resilient materials, which comprises a machine for producing spirals of resilient materials which are already in the form of strip, said machine consisting of means for feeding and guiding the strip to bending means, bending means formed by at least one roller which curls the incoming strip, an abutment plate for progressively unbending the curled strip, and delivery means of the formed spiral which pass same standing upright on its edges onto a conveyor belt, placed beneath the said delivery means and running on rollers, one of which is connected to driving means, and a support for the panel frame to be filled placed on the said conveyor belt and inclined relative to its surface, being very close to it at the exit and spaced above the said conveyor belt at the end facing the machine by a distance greater than the width of the spirals, said support being formed by a pair of spaced angle members.

16. A machine installation for producing hollow panels filled with distance pieces, formed by spirals of resilient materials, which comprises a machine for producing spirals of resilient materials which are already in the form of strip, said machine consisting of means for feeding and guiding the strip to bending means, bending means formed by at least one roller which curls the incoming strip, an abutment plate for progressively unbending the curled strip, and delivery means of the formed spiral which pass same standing upright on its edges onto a conveyor belt, placed beneath the said delivery means and running on rollers, one of which is connected to driving means, and a support for the panel frame to be filled placed on the said conveyor belt and inclined relative to its surface, being very close to it at the exit and spaced above the said conveyor belt at the end facing the machine by a distance greater than the width of the spirals, said support being formed by a pair of parallel angle members, the end of the conveyor belt furthest from the spiral producing machine being connected to a bridging member over which filled frames can slide towards means for their further processing.

17. A machine installation according to claim 16, in which a foot-pedal is provided which starts and stops the operation of the spiral producing machine.

References Cited

UNITED STATES PATENTS

| | | | |
|---|---|---|---|
| 1,662,577 | 3/1928 | Johnson | 72—146 |
| 2,609,192 | 9/1952 | Lermont | 72—146 |
| 2,662,573 | 12/1953 | Cichuski et al. | 72—166 |
| 3,205,689 | 9/1965 | Joseph | 72—465 |

CHARLES W. LANHAM, *Primary Examiner.*

R. D. GREFE, *Assistant Examiner.*